US011323867B2

(12) United States Patent
Bolot et al.

(10) Patent No.: US 11,323,867 B2
(45) Date of Patent: May 3, 2022

(54) METHOD AND DEVICES FOR PROVIDING WIRELESS COVERAGE

(71) Applicant: INTERDIGITAL CE PATENT HOLDINGS, SAS, Paris (FR)

(72) Inventors: Jean C. Bolot, Los Altos, CA (US); Kent Lyons, Mountain view, CA (US); Akshay Pushparaja, Mountain View, CA (US); Ajith Pudhiyaveetil, Sunnyvale, CA (US)

(73) Assignee: InterDigital CE Patent Holdings, SAS, Paris (FR)

( * ) Notice: Subject to any disclaimer, the term of this patent is extended or adjusted under 35 U.S.C. 154(b) by 705 days.

(21) Appl. No.: 16/300,258

(22) PCT Filed: May 23, 2017

(86) PCT No.: PCT/US2017/033906
§ 371 (c)(1),
(2) Date: Nov. 9, 2018

(87) PCT Pub. No.: WO2017/205314
PCT Pub. Date: Nov. 30, 2017

(65) Prior Publication Data
US 2021/0258754 A1 Aug. 19, 2021

Related U.S. Application Data

(60) Provisional application No. 62/340,213, filed on May 23, 2016.

(51) Int. Cl.
H04W 4/14 (2009.01)
H04W 4/90 (2018.01)
(Continued)

(52) U.S. Cl.
CPC ............. H04W 4/90 (2018.02); H04W 4/029 (2018.02); H04W 4/14 (2013.01); H04W 64/006 (2013.01); H04W 76/50 (2018.02)

(58) Field of Classification Search
CPC ................................ H04W 4/90; H04W 88/16
See application file for complete search history.

(56) References Cited

U.S. PATENT DOCUMENTS 8,699,943 B2   4/2014   Kummetz et al.
9,094,796 B2   7/2015   Agrawal et al.
(Continued)

FOREIGN PATENT DOCUMENTS

CN   102811085 A   12/2012
CN   104284417 A   1/2015
(Continued)

OTHER PUBLICATIONS

Machine Translation of JP 2007233751 A.

Primary Examiner — Qutbuddin Ghulamali
(74) Attorney, Agent, or Firm — Condo Roccia Koptiw LLP

(57) ABSTRACT

The present disclosure relates to a device for providing wireless signal coverage. The device includes a wireless signal transceiver and a displacement assembly for moving the wireless signal transceiver within a zone. The device is provided with a processor configured to control the displacement assembly to move the mobile device based on the wireless signal coverage within the zone and the location with respect to the zone of a wireless device operable to access the wireless signal coverage.

19 Claims, 3 Drawing Sheets

(51) Int. Cl.
*H04W 4/029* (2018.01)
*H04W 76/50* (2018.01)
*H04W 64/00* (2009.01)

(56) References Cited

U.S. PATENT DOCUMENTS

| | | | | |
|---|---|---|---|---|
| 2005/0004708 A1* | 1/2005 | Goldenberg | ......... | G05D 1/0022 |
| | | | | 700/245 |
| 2013/0088982 A1* | 4/2013 | Jeon | ...................... | H04W 24/02 |
| | | | | 370/252 |
| 2013/0268118 A1* | 10/2013 | Grinstead | ................ | B25J 5/005 |
| | | | | 700/259 |
| 2015/0071164 A1 | 3/2015 | Rappaport | | |
| 2016/0037304 A1 | 2/2016 | Dunkin et al. | | |
| 2018/0277937 A1* | 9/2018 | Yang | ........................ | H01Q 1/42 |

FOREIGN PATENT DOCUMENTS

| | | |
|---|---|---|
| EP | 0976879 | 2/2000 |
| JP | 2007233751 A | 9/2007 |
| JP | 2011250159 A | 12/2011 |
| JP | 2016012889 A1 | 1/2016 |
| JP | 2017527176 A | 9/2017 |
| KR | 20110068933 | 6/2011 |
| KR | 20130037089 A | 4/2013 |

\* cited by examiner

METHOD AND DEVICES FOR PROVIDING WIRELESS COVERAGE

TECHNICAL FIELD

The present disclosure relates to a method and device for providing wireless coverage. Particularly, but not exclusively, embodiments relate to a mobile device providing wireless network access for example a mobile repeater of a wireless local area network or an at least partially mobile gateway for access to a network. Movement of the mobile device may be based on wireless coverage and a user location.

BACKGROUND

Wireless coverage in a local area such as a home environment can vary according to location. Wireless communications may include communications by wireless signals such as radio signals (e.g. wifi, etc) infra red signals etc. Local area network WLAN connectivity e.g. WiFi connectivity in a given zone can be a critical component for accessing a wide area network (WAN) such as the Internet to watch movies, shop, search, and run a multitude of applications. Often users, for example in a home environment do not experience uniformly good WiFi coverage. This is because the strength of the WiFi signal, and therefore the quality of the coverage, decreases the further away a user device is from the gateway or Access Point (AP). Moreover obstacles such as walls and objects (furniture, appliances . . . ) further decrease the quality of coverage The present disclosure has been devised with the foregoing in mind.

SUMMARY

In a general form the disclosure concerns a mobile device providing wireless signal coverage in a given zone, the mobile device being displaced according to wireless coverage within the zone and/or the location of the user with respect to the zone. Embodiments may relate to a mobile access point to a network, for example a WLAN, LAN or WAN network. The mobile access point may for example be a wireless repeater (amplifying or boosting a wifi signal) or at least part of a gateway device providing access to a wide area network.

According to a first aspect of the disclosure there is provided a device for providing wireless signal coverage, the device comprising: a wireless signal transceiver for receiving and transmitting wireless signals to provide wireless signal coverage; a displacement assembly for moving the wireless signal transceiver within a zone; a processor configured to control the displacement assembly to move the mobile device based on the wireless signal coverage within the zone and the location with respect to the zone of a wireless device operable to access the wireless signal coverage.

In an embodiment, the mobile access point device is a wifi repeater. In another embodiment, the mobile access point device comprises part of a gateway device In an embodiment, wifi coverage within a given zone is mapped. The coverage may be mapped by measuring RSSI for example. The processor may be configured to move the mobile device based on the mapped coverage.

Mobility may be provided by a wheeled platform, a sphere shaped rolling device for example. Movement is piloted by the processor in accordance with wifi coverage and location of a user In an embodiment, patterns of location and mobility of users, are learned to position the repeater or gateway device, for example in advance and/or to adapt their position as needed Location of a user may be determined by for example gps or a user vocal or text input.

In an embodiment, learn patterns of use per device, position and bandwidth allocation are determined to optimize quality of experience QoE (for example video vs mail browsing)

In an embodiment the method is optimized for multiple robotic devices, multiple APs, multiple wireless technologies, even multiple homes in dense apartment environments.

In embodiments a robot device for a repeater or a gateway is provided with one or more processors configured to perform one or more of the following:

- locate a user and map wifi coverage layout
- identify that a user device (based on determined location) is in poor WiFi coverage area
- build autonomous wireless coverage map, for example static or dynamic
- identify optimal static position(s) to improve coverage of user
- provide optimization given layout, user location and coverage map,
- extend optimization to "piecewise-static user", in one of K known locations
- add learning based on user history, pre-positions itself in appropriate spot according to user history
- learn historical user patterns, plan and execute robot motion accordingly.
- handle a more general case of N users A further aspect provides an electronic device comprising memory, one or more processors; and one or more modules stored in the memory and configured for execution by the one or more processors, the one or more modules including instructions for performing the processes described in the present disclosure.

Another aspect provides a method for providing wireless signal coverage in a zone, the method comprising controlling movement of a mobile device providing wireless signal coverage based on the wireless signal coverage within the zone and the location with respect to the zone of a wireless device operable to access the wireless signal coverage.

Some steps of processes implemented by embodiments may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since at least some features can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 1:
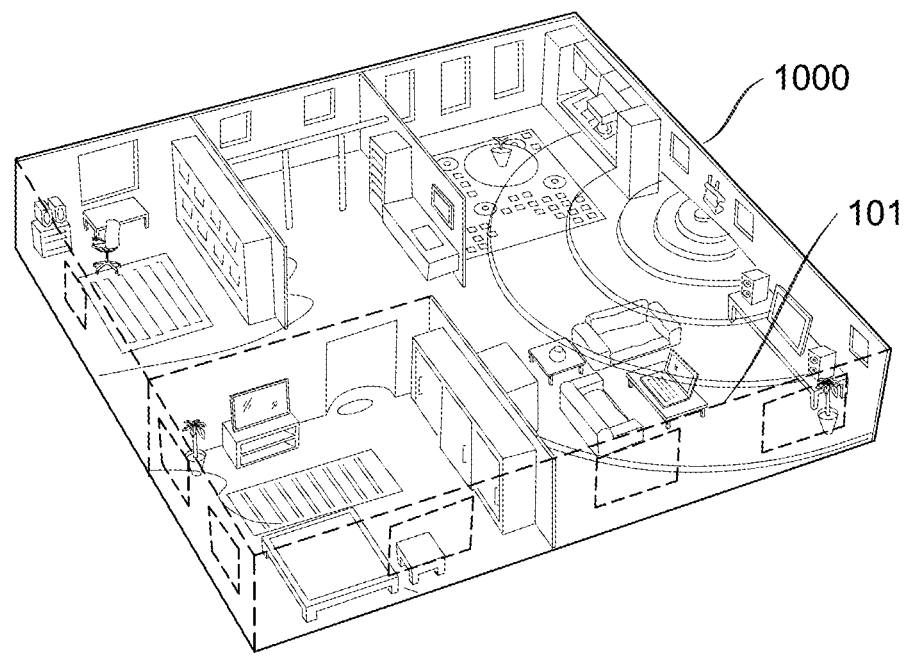
FIG. 1 illustrates an example of wireless coverage in accordance with one or more embodiments of the disclosure.

FIG. 1 illustrates an example of a zone 1000 where embodiments may be implemented. The zone is a home environment made up of a number of rooms within a building. A network access point in the form of gateway device 1200 provides wireless network coverage within a living room 1001. As illustrated by the wireless signal intensity mao (similar to a heat map) in FIG. 1, the intensity of wireless network coverage decreases with distance from the access point. Moreover, the presence of obstacles between the access point and other points in the building such as walls and furniture impacts the wireless coverage in certain areas.

Figure 2:
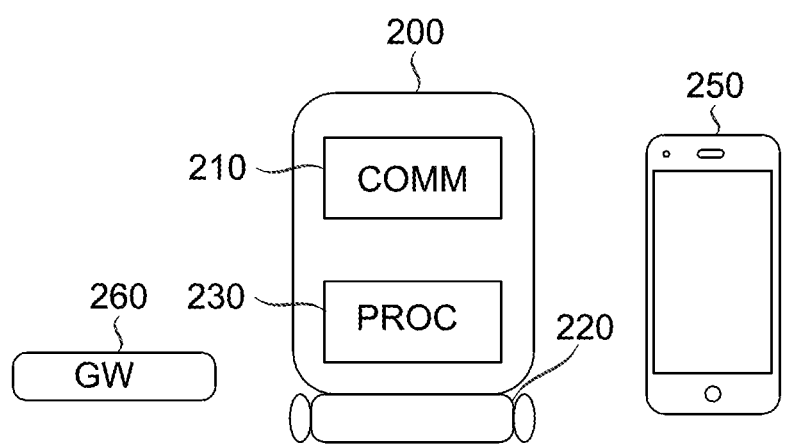
FIG. 2 illustrates a device for providing wireless coverage in accordance with an embodiment.

An embodiment of a device for providing wireless signal coverage in a zone will be described with reference to FIG. 2.

The device 200 includes a communication unit 210 for sending and receiving wireless signals, a displacement assembly 220 for moving the device 200 from one point to another point within the zone and a processor 230 for providing commands to the displacement assembly 220 to move the device 200 based on wireless signal coverage and the position of a user's wireless device 250 operable to access the wireless network. The displacement assembly 220 may comprise wheels or sphere shaped mobility elements for moving the device 200 across the ground. The communication unit 210 exchanges wireless signals with a gateway device 260 for example and a wireless device 250 of a user. In some embodiments, the communication unit 210 may operate as a wifi repeater to boost or repeat a wireless signal received from the gateway 260 or user device 250.

The processor 230 is configured to provide control signals to the displacement assembly 220 to move the device 200 based on the location of the wireless user device 250. In this way the device 200 can be moved in order to provide better wireless network coverage to the wireless user device 250. Since the device 200 is mobile, it may be moved anywhere in the local areal, to provide an improved wireless coverage to the wireless device 250 of the user.

In some embodiments the device providing wireless coverage may be part of a gateway. Such a gateway may include an immobile part similar to a docking station and a mobile part co-operating with the docking station. The immobile part is connectable to wired Internet access: cable, DSL, fiber, etc. The gateway also includes access to a power supply, connectivity to the mobile part, and other wireless connectivity such as WiFi etc; and a mobile part, similar to the mobile device 200 of the previous embodiment. The mobile part may also have WiFi and/or other wireless capabilities, In some embodiments the mobile device providing wireless coverage may include sensing components for contextual and location awareness.

Figure 3:
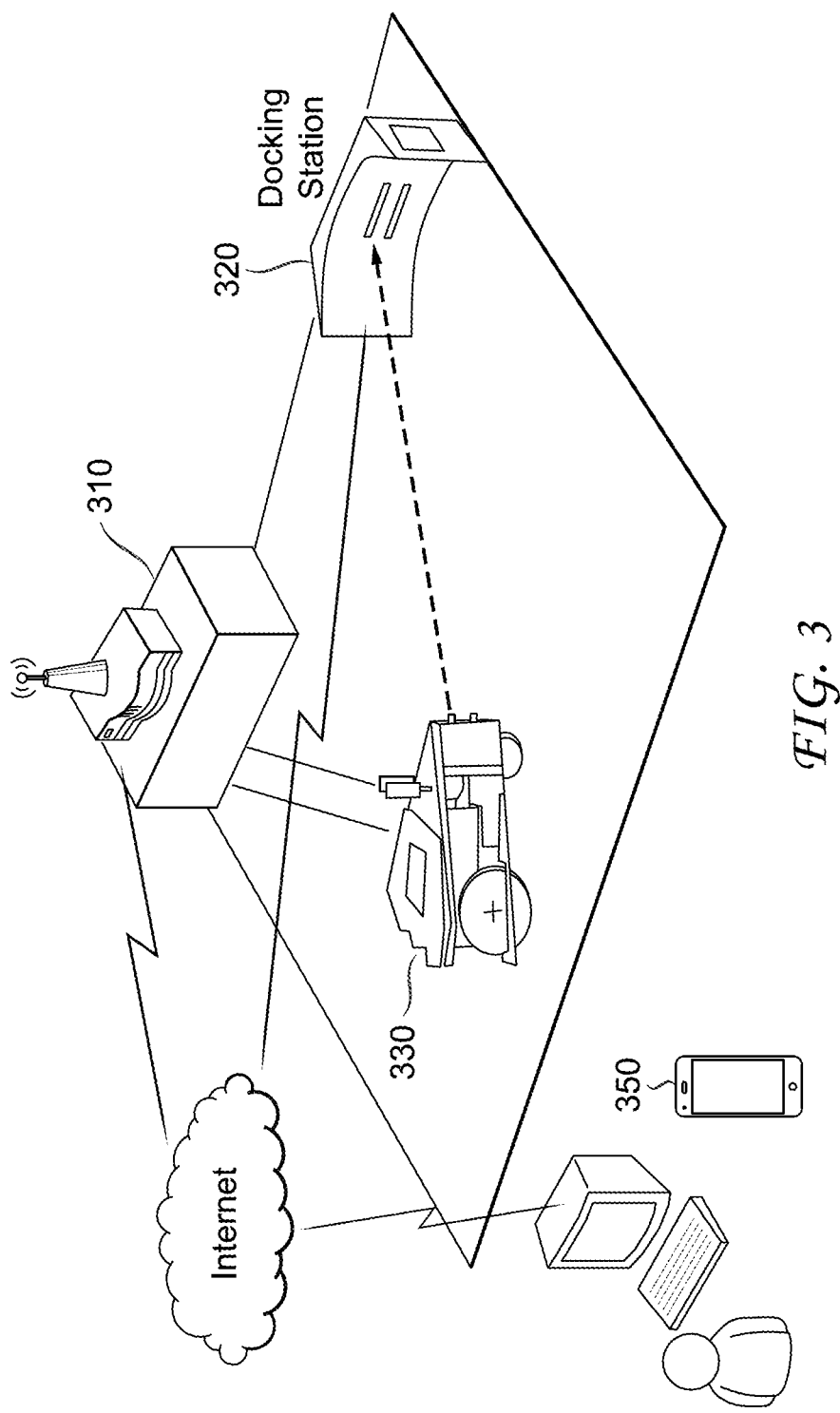
FIG. 3 illustrates an example of a wireless system comprising partially mobile gateway device in accordance with embodiments of the disclosure

A particular embodiment of a system for providing wireless signal coverage in a zone will be described with reference to FIG. 3.

The system 300 includes a gateway device 310, a docking station 320 and a mobile robotic device 330 associated with the docking station 320. While in the illustrated embodiment the docking station is separate to the gateway it will be appreciated that in other embodiments the docking station 330 may be part of the gateway 310. The gateway device 310 is connectable to wired Internet access: cable, DSL, fiber, etc and provides access by a wireless local rea network.

A wireless user device 350 can access the internet via the gateway device 310 by means of the mobile robotic device 330 which moves towards the location of the wireless user device 350 in order to enhance wifi coverage for the wireless device 350. A wireless link is set up between the user's wireless device 350 and the mobile robotic device 330 and between the mobile robotic device 330 and the docking station 320 which communicates with gateway 310.

In some embodiments, the mobile robotic device 330 may be configured to acquire, estimate and/or predict when the wireless device has poor wireless coverage and to position itself to improve that wireless coverage for the user device. It can also adapt its position depending on user behavior, to improve coverage. In this way the mobile robotic device 330 may be pre-positioned at an appropriate location to provide good wireless network coverage to the wireless device user if the user's habits have been learned and a user location predicted accordingly.

Figures 4A, 4B, 4C:
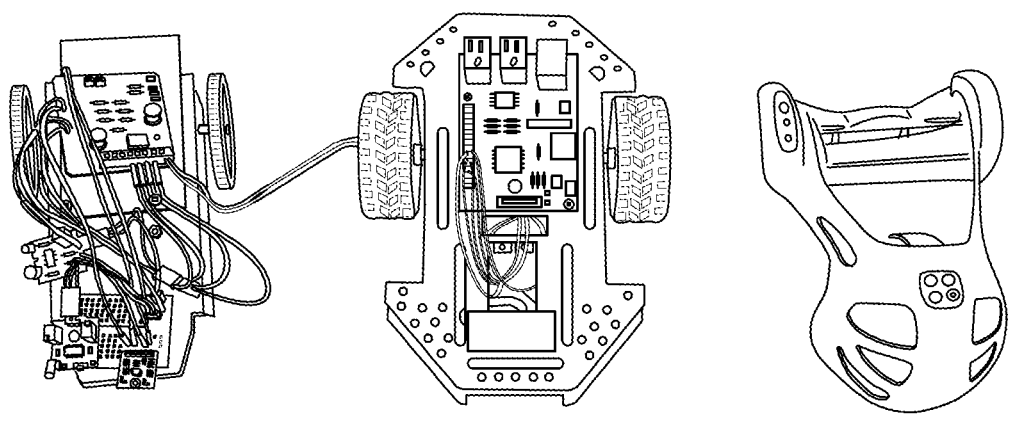
FIG. 4 illustrates examples of mobile robotic devices in accordance with embodiments of the disclosure.

It will be further described how it may be estimated or predicted when the user has poor coverage, where the user moves to, etc FIG. 4 illustrates three examples of mobile devices for providing mobility to wireless access points to a network in accordance with embodiments. The illustrated devices may be wifi repeaters, or parts of a gateway.

Robot repeaters A and B are provided with 3 or 4 battery-powered wheels to move around and sensors to detect obstacles on the path. Robot C is a mobile device in the form of a ball or sphere for example a Sphero SPRK which provides mobility along with a chariot the black structure to carry cargo such as for example a gateway part or repeater providing wireless coverage.

It will be appreciated however that a displacement assembly for a mobile device providing wireless signal coverage such as robot repeaters or robot gateway devices could have any other number of form factors, such as but not limited to for example
- a wheeled platform
- sphere—or other geometric form-based platform the mobile wireless coverage device (e.g. wifi repeater or mobile gateway part) within the sphere
- a robot+docking station where the robot returns to the docking station to recharge batteries for example
- a drone, or combination drone+docking station, or drone+ ground-based robot+docking station
- a balloon, for example helium-based balloon or zeppelin, or similar kind of device
- Legged-based robots, or snake-based form factors, or any other form factor that enables mobility In some embodiments the mobile device providing wireless coverage may include sensing components for contextual and location awareness In embodiments the device providing wireless access for example the robot repeater or robot gateway device may be configured to acquire, estimate or predict when a user has poor coverage and positions itself to improve that coverage. To determine wireless coverage the device can obtain or create a "heat map" of WiFi coverage in the house such as the heat map shown FIG. 1. This may be implemented by the device or another wireless coverage estimation device roaming around the zone of use and measuring signal strength at different locations. The quality of coverage may be measured using Received Signal Strength Indicator (RSSI). RSSI is typically measured in decibels, from 0 to −120 dB in general, with coverage better the closer you are to 0. A RSSI>−45 dB is good, less than −50 dB gets mediocre or worse.

The location of a user device may be determined or predicted and, by combining heat map and estimated location of user, it may be determined if the user device has good or poor wireless coverage. Some tools enable a "heat map" of WiFi coverage, to be measured and drawn by plotting RSSI as a function of location in a home, for example as illustrated in FIG. 1.

The location of a wireless user device of a user may be determined in a number of ways:

- Voice (by voice recognition) or text information received from user indicating their location for example "I am in the kitchen" or "at coordinate xyz"
- Using sensors such as an audio or vibration or other sensor that can be used to infer the position of the user relative to the robot (strong vibration from walking means user is close) or using distance sensors like Infrared or UWB (Ultra-WideBand) sensors or others
- Using data capturing user behaviour, for example RSSI received from user (which indicates distance between user and a wireless AP) which is then read by the mobile access point
- Directly from user, gps or triangulation (WiFi or other), received for example via an app running on user phone or tablet
- RSSI or other information on signal strength or coverage may be obtained directly from the user, measured for example on a device such as phone or tablet or wearable worn by the user, or via voice or text command from the user for example who says "bad coverage"

The device providing wireless coverage may obtain RSSI or other relevant wireless coverage information via a third party, such as the access point (where user coverage information could we pushed or pulled), the cloud, or some other third party service or app It may be noted that the device may obtain information in real-time, or the information may be obtained previously, or user coverage data may be (predicted using past information about user habits and coverage data, using predictive analytics techniques for example)

The mobile device may be moved accordingly when it is estimated or predicted that the user has poor coverage for accessing the wireless network with a wireless device.

Anywhere in the monitored area e.g. the house, which improves the user experience—for example which would increase the RSSI level toward 0, or improves any other quality of experience metric for the user The robotic repeater or gateway could take criteria other than user coverage or experience into account, for example: convenience (stay out of high-traffic paths in home, stay away from doorways, etc. In the case where mobility is provided by a drone, the device could fly at a height greater than the user's height to avoid collision, etc), minimize battery usage or optimize power-related issues for robot, minimize path travelled by robot, avoid obstacle, adapt to user activity on WiFi (for example robot tries to optimize user RSSI if user is watching movie, but only tries to provide OK coverage (RSSI above some reasonable value) if the user is sending mail or browsing)

As mentioned above, the robotic repeater or gateway can also pre-position itself based on learned behaviour or contextual information about the users, spatial configuration, characteristics of the AP, etc. Such information could be obtain from sensors on the device or from sensor data obtained by another device The robotic repeater or gateway can also respond to explicit requests, for example voice or text request "come here" or "in the kitchen.

Figure 5:
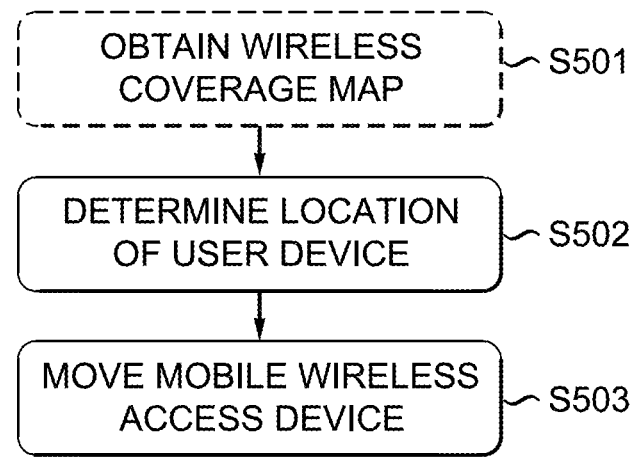
FIG. 5 is a flow chart of a method of providing wireless coverage according to an embodiment

FIG. 5 is a method of providing wireless coverage according to an embodiment of the invention. In step S501 a wireless coverage map of the zone of use is obtained. As described above the wireless coverage map may be based on RSSI measurements of the zone of use. The wireless coverage map may have been obtained previously by another device with the data being provided to the mobile wireless coverage device or may be obtained by signal strength measurements performed by the mobile wireless coverage device.

In step S502 the location of the user device operable to use the wireless coverage is determined. The determination may be a prediction of the location of the user device based on user history or be determined based on at least one of a voice recognition command, a GPS signal, triangulation an infra-red signal detection, vibration detection, audio detection.

In step S503 the processor generates control signals based on the wireless coverage map and the location of the user device to cause the displacement assembly to move the device accordingly such that the wireless coverage to the user device is optimized.

Embodiments of the invention may be applied to the case of multiple robots, multiple users, multiple APs, multiple type of wireless connectivity and coverage.

For example for a single mobile device providing wireless coverage, the device acquires, estimates or predicts the location of a plurality of users, and the device is positioned accordingly to provide better or best coverage to those users. The position may be selected to satisfy a number of policies, for example: best coverage for a single top-priority user (ignoring the others), rank users in decreasing priority and weigh the RSSI/coverage/signal strength of users according to the priority, tries to maximize the coverage received by the worst user, etc. These are all classic optimization techniques in multi-user environments and all of them could be considered here.

In embodiments comprising multiple robotic mobile devices providing wireless coverage and multiple user devices, the robotic mobile devices can be allocated one or more per user, or one or more users may be allocated to a robotic mobile device.

In some embodiments of the invention the device may provide wireless coverage for multiple technologies/standards such as WiFi, Zigbee, cellular, 3/4/5/6G and beyond, UWB, . . . .

In embodiments where multiple robotic devices are employed the robotic devices can operate independently from one other, or share information for further optimization (for example their location to avoid collision, or WiFi channel usage for optimal channel allocation, or contextual information to speed up their learning or cold start process, etc), or operate collaboratively (for example by creating a mesh of robot repeaters)

Embodiments of the invention also apply to the case of multiple zones for example multiple homes, for example in dense apartment environments, with robots optimizing the sensing, learning and positioning across multiple homes. For example, one or more mobile robotic devices may be used to better locate users and position itself in apartment #1 to provide better coverage to users in both apartment #1 and apartment #2 below/above/next As already mentioned, the idea of a smart and mobile repeater works for the home, but also for WiFi (or other wireless connectivity) in the enterprise, on a factory floor, in a plane, etc—in other words anywhere WiFi or wireless connectivity is provided Embodiments of the invention relate to making access points to networks for example a repeater or a gateway device configured to be mobile and smart.

The design above provides the usual functionality of the "standard" gateway, with the improved coverage offered by the mobile part. It also offers new capabilities. For example: Having WiFi transmitter and received antennas in both the fixed and the mobile parts enables high-precision localization of users in the house, as well as the detection of users' breathing patterns, gestures, etc. All this user and contextual information can then be used for personalization and other new services Another way is to have the box be completely untethered, which becomes possible with technologies such as 5G and beyond, microcell/heterogeneous networks. The static box of today then becomes a smart and mobile box. Power could be provided by batteries, inductive charging in the floor, energy harvesting or a combination of the above, . . . .

Components of embodiments of the invention may be implemented by functional modules, which may or may not correspond to distinguishable physical units. For example, a plurality of such modules may be associated in a unique component or circuit, or correspond to software functionalities. Moreover, a module may potentially be composed of separate physical entities or software functionalities.

A functional module may be implemented as a hardware circuit comprising for example VLSI circuits or gate arrays, discrete semiconductor conductors such as logic chips, transistors etc. A module may also be implemented in a programmable hardware device such as field programmable gate arrays, programmable array logic, programmable logic devices or the like.

Modules may also be implemented in software for execution by various types of processors. A module or component of executable code may comprises one or more physical or logical blocks of computer instructions may may for instance be organized as an object, procedure or function. Executables of a module may not necessarily be located together.

Moreover, modules may also be implemented as a combination of software and one or more hardware devices. For example a module may be embodied in the combination of a processor that operates a set of operational data. Moreover, a module may be implemented in the combination of an electronic signal communicate via transmission circuitry.

Although the present disclosure has been presented with reference to specific embodiments, the present invention is not limited to the specific embodiments, and modifications will be apparent to a skilled person in the art which lie within the scope of the present invention.

For instance, while the foregoing examples have been described with respect to wifi coverage it will be appreciated that embodiments may be used to provide other wireless communications such as infra-red communication for example.

It will be appreciated that while the present embodiments are described in the context of a home environment it will be appreciated the that the embodiments of the invention may be applied for network access in an enterprise environment, on a factory floor, in a plane, train, etc.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A device for providing wireless signal coverage to a plurality of wireless devices, the device comprising:
   a wireless signal transceiver;
   a displacement assembly for moving the wireless signal transceiver within a zone; and
   a processor configured to:
   obtain a wireless coverage map of the zone;
   determine a location of each of the plurality of wireless devices with respect to the zone; and
   control the displacement assembly, based on the wireless coverage map, the location of each of the plurality of wireless devices with respect to the zone, and a priority ranking of the plurality of wireless devices, to move the wireless signal transceiver to a position selected to provide wireless signal coverage satisfying a policy.

2. The device of claim 1, wherein the wireless signal transceiver provides access to a wireless signal associated with at least one of a Wi-Fi network, a Zigbee network, or a cellular network.

3. The device claim 1, wherein the device comprises a Wi-Fi repeater.

4. The device claim 1, wherein the device is part of a gateway.

5. The device of claim 1, wherein the wireless signal coverage is based on Received Signal Strength Indications measured in the zone.

6. The device of claim 1, further comprising an obstacle sensor for detecting a presence of obstacles on a path of movement of the device, wherein the processor is configured to control movement of the displacement assembly based on obstacle detection.

7. The device of claim 1, wherein the processor is further configured to control movement of the displacement assembly based on usage of one or more of the plurality of wireless devices.

8. The device of claim 1, wherein the location of one or more of the plurality of wireless devices is determined based on at least one of a voice recognition command, a GPS signal, a triangulation, an infra-red signal detection, a vibration detection, or an audio detection.

9. The device of claim 1, wherein the location of one or more of the plurality of wireless devices is predicted based on a user behavior history.

10. The method of claim 1, wherein the policy comprises providing the wireless signal coverage based on one or more of:

providing a best-quality wireless signal coverage for a single top-priority wireless device;

providing a wireless signal coverage based on a rank of the plurality of wireless devices in decreasing priority order;

weighting of a RSSI, a coverage, or a signal strength of the plurality of wireless devices according to the priority; or maximizing of the coverage received by a wireless device of the plurality of wireless devices receiving a worst coverage.

11. A method for providing wireless signal coverage in a zone, the method comprising:

obtaining a wireless coverage map of the zone;

determining a location of each of a plurality of wireless devices with respect to the zone; and controlling movement of a mobile device including a wireless signal transceiver providing wireless signal coverage, based on the wireless coverage map of the zone, the location of each of the plurality of wireless devices with respect to the zone, and a priority ranking of the plurality of wireless devices, to move the wireless signal transceiver to a position selected to provide wireless signal coverage satisfying a policy.

12. The method of claim 11, further comprising detecting a presence of obstacles on a path of movement of the mobile device and controlling movement of the mobile device based on obstacle detection.

13. The method of claim 11, further comprising controlling movement of the mobile device based on usage of one or more of the plurality of wireless devices.

14. The method of claim 11, wherein the location of one or more of the plurality of wireless devices is determined based on at least one of a voice recognition command, a GPS signal, a triangulation, an infra-red signal detection, a vibration detection, or an audio detection.

15. The method of claim 11, wherein providing the wireless signal coverage comprises providing access to a wireless signal associated with at least one of a Wi-Fi network, a Zigbee network, or a cellular network.

16. The method of claim 11, wherein the wireless signal coverage is based on Received Signal Strength Indications measured in the zone.

17. The method of claim 11, wherein determining the location of one or more of the plurality of wireless devices is based on a user behavior history.

18. The method of claim 11, wherein the policy comprises providing the wireless signal coverage based on one or more of:

providing a best-quality wireless signal coverage for a single top-priority wireless device;

providing a wireless signal coverage based on a rank of the plurality of wireless devices in decreasing priority order;

weighting of a RSSI, a coverage, or a signal strength of the plurality of wireless devices according to the priority; or maximizing of the coverage received by a wireless device of the plurality of wireless devices receiving a worst coverage.

19. A non-transitory computer readable storage medium having stored thereon instructions for implementing a method according to claim 11.

* * * * *